Patented July 19, 1938

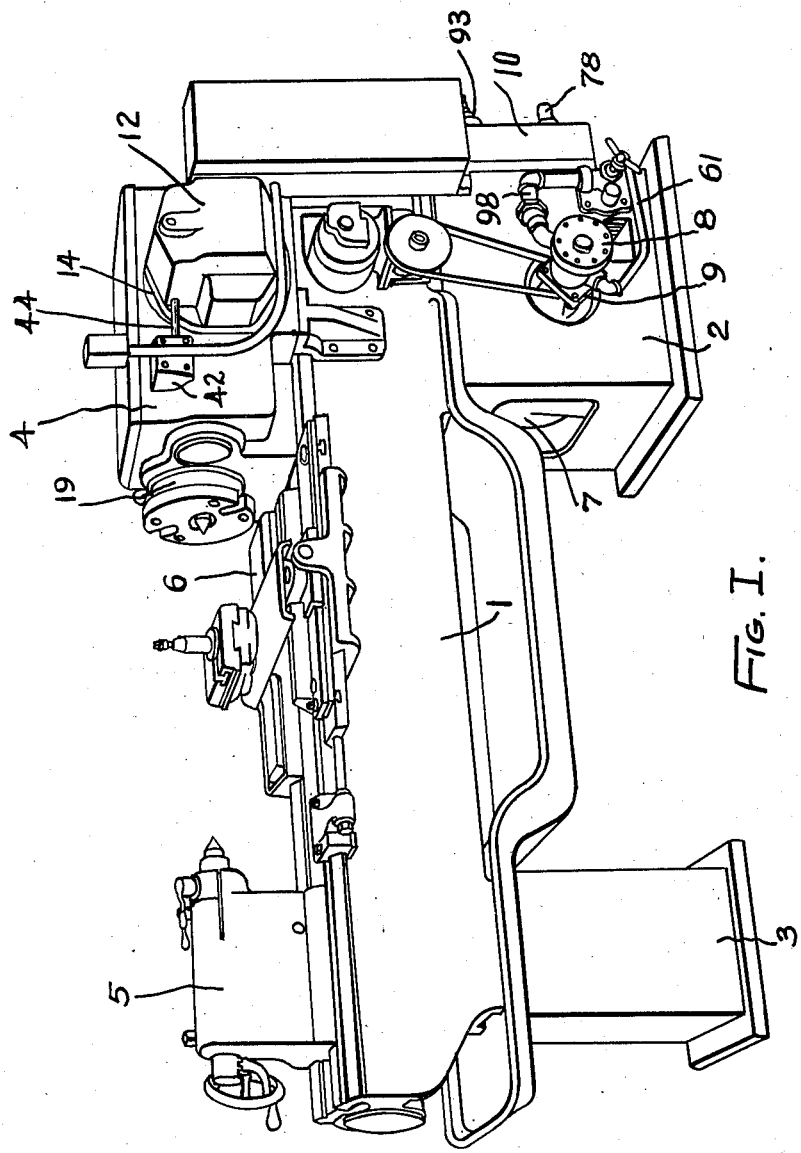

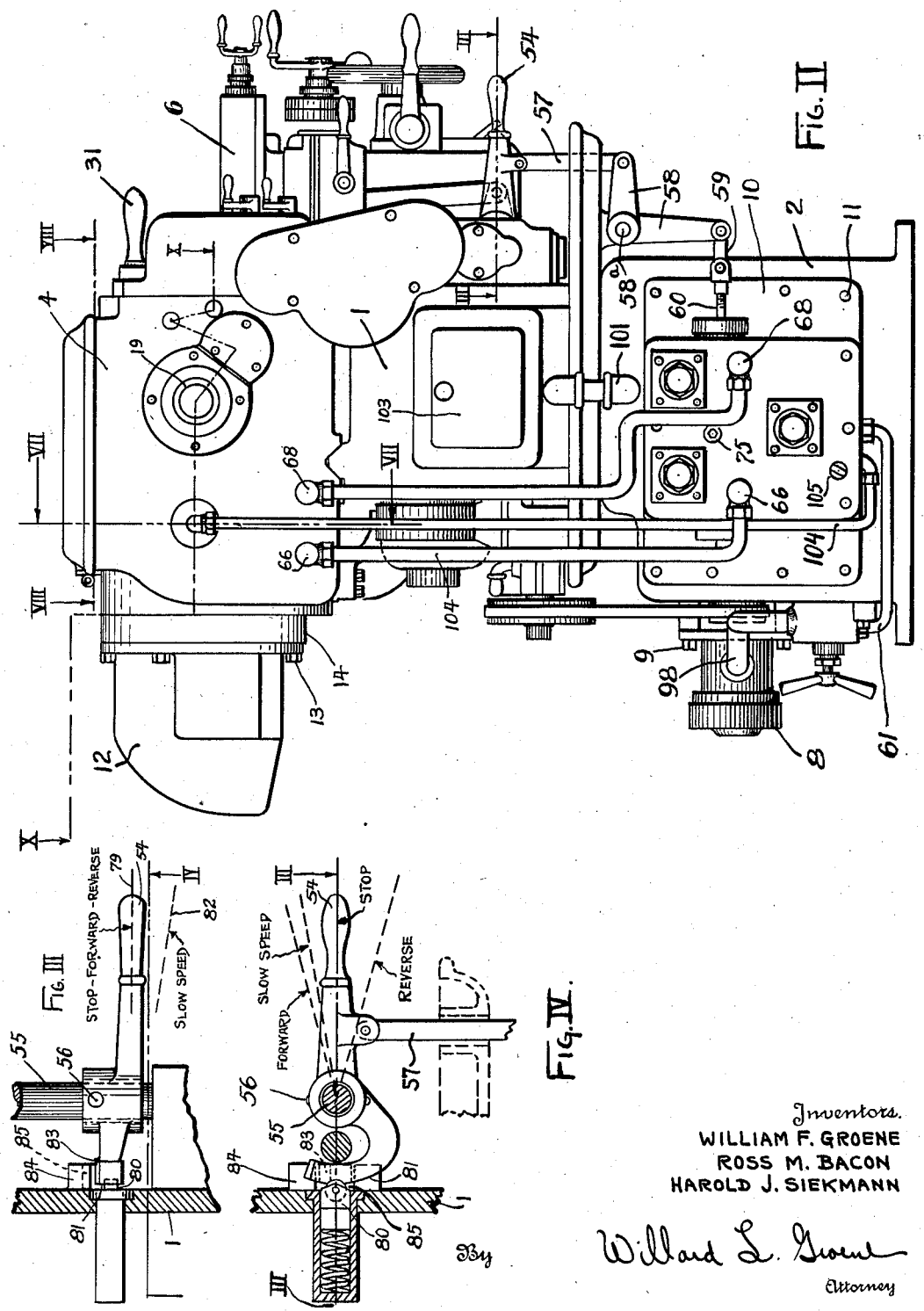

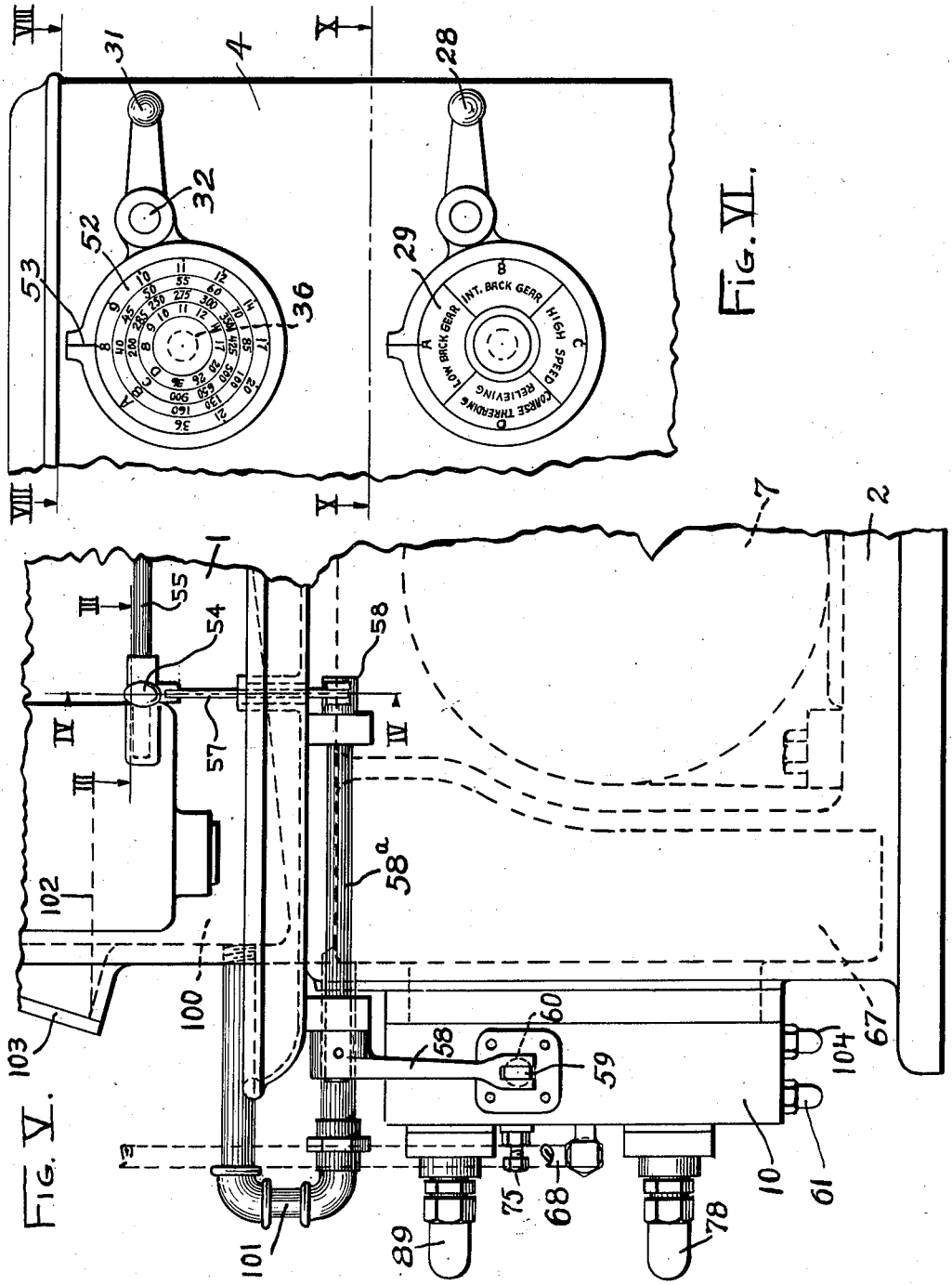

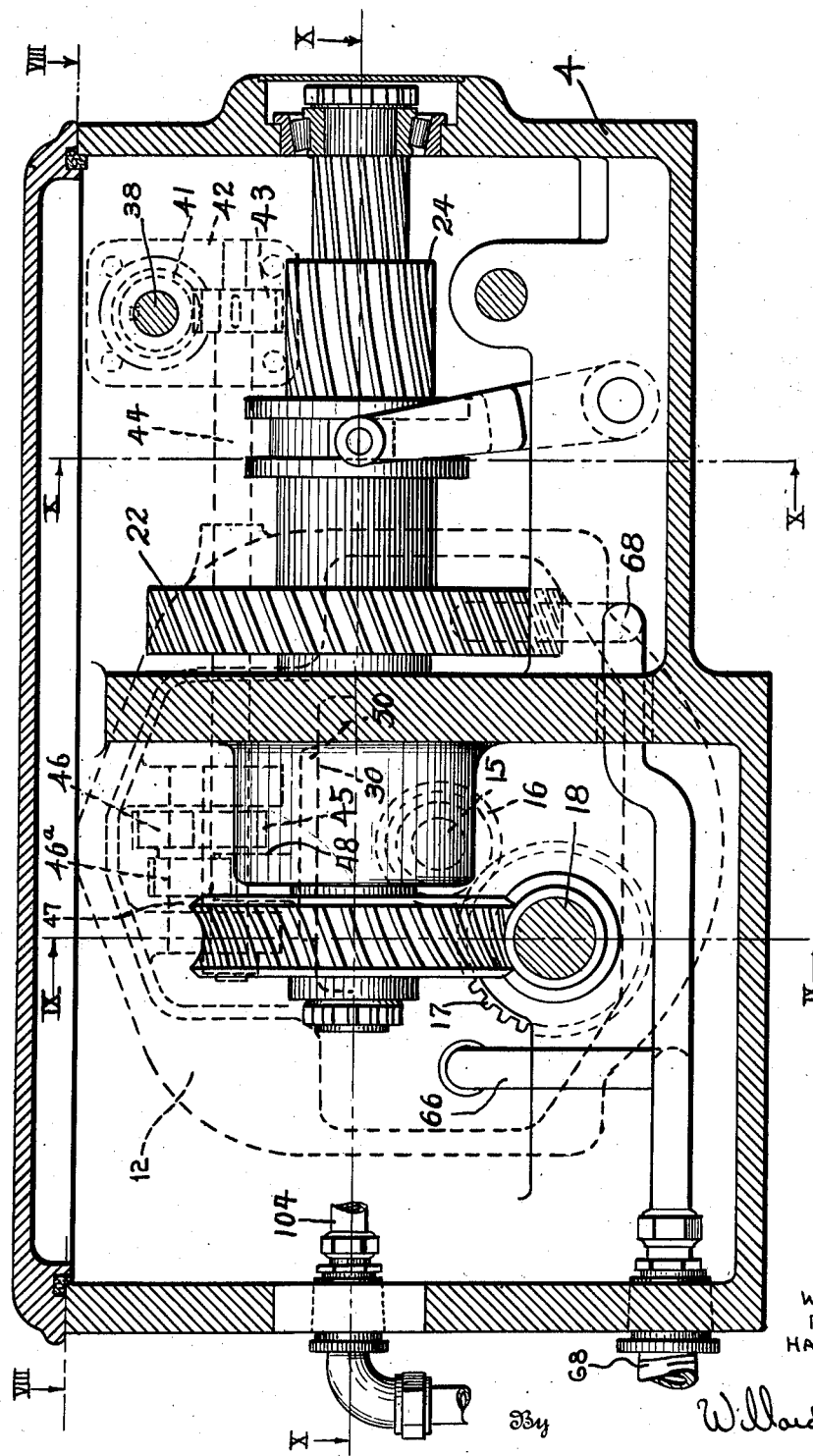

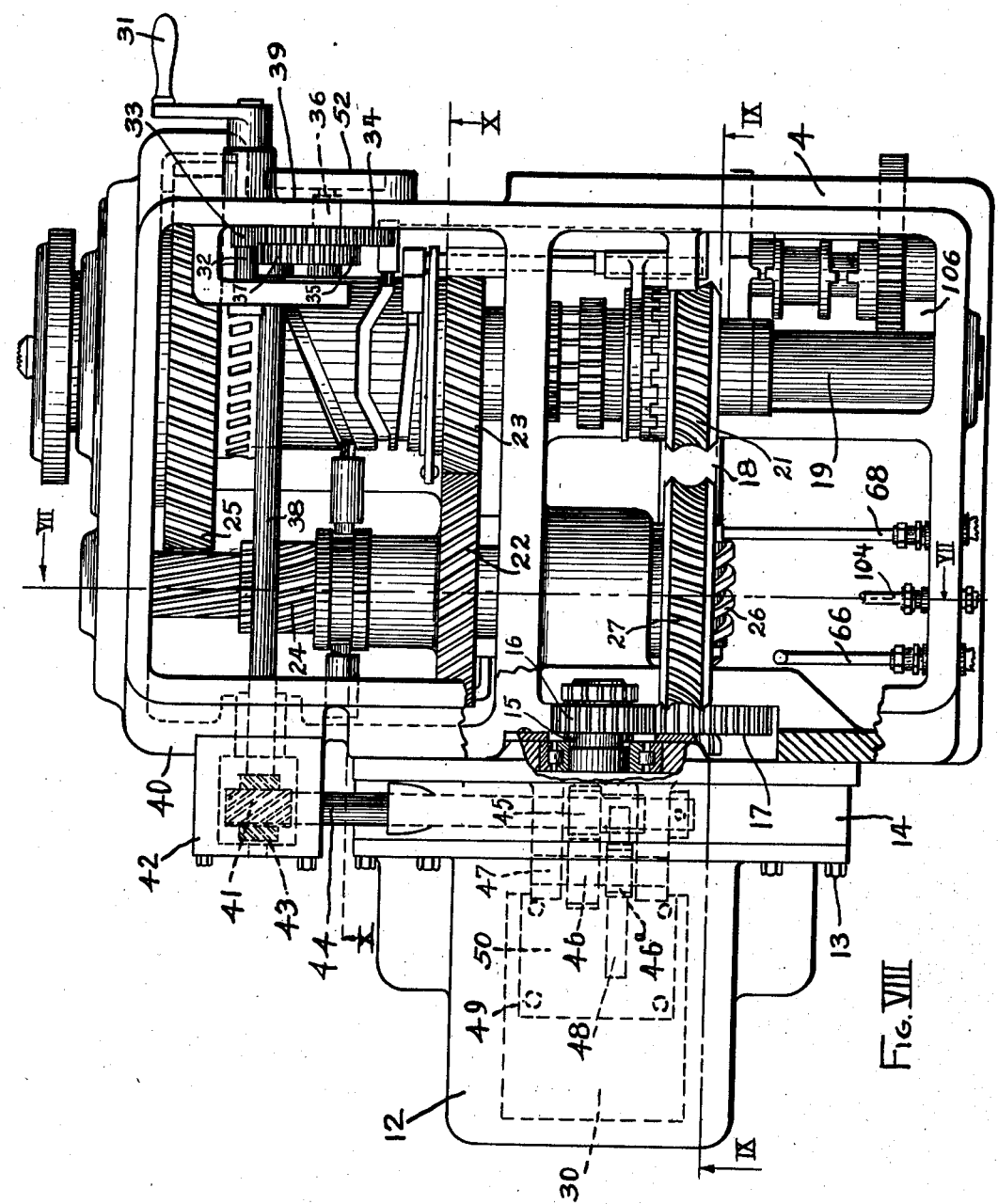

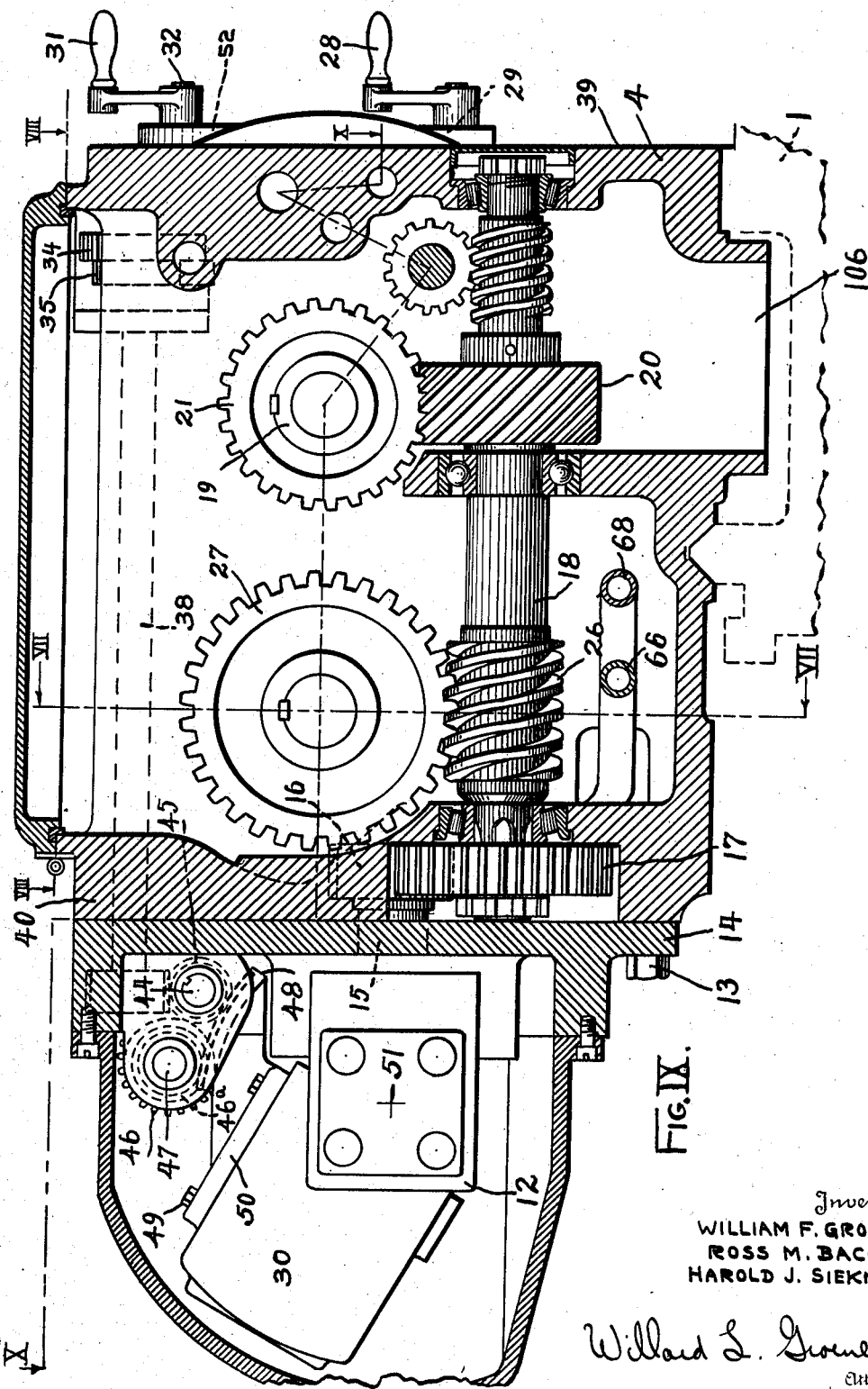

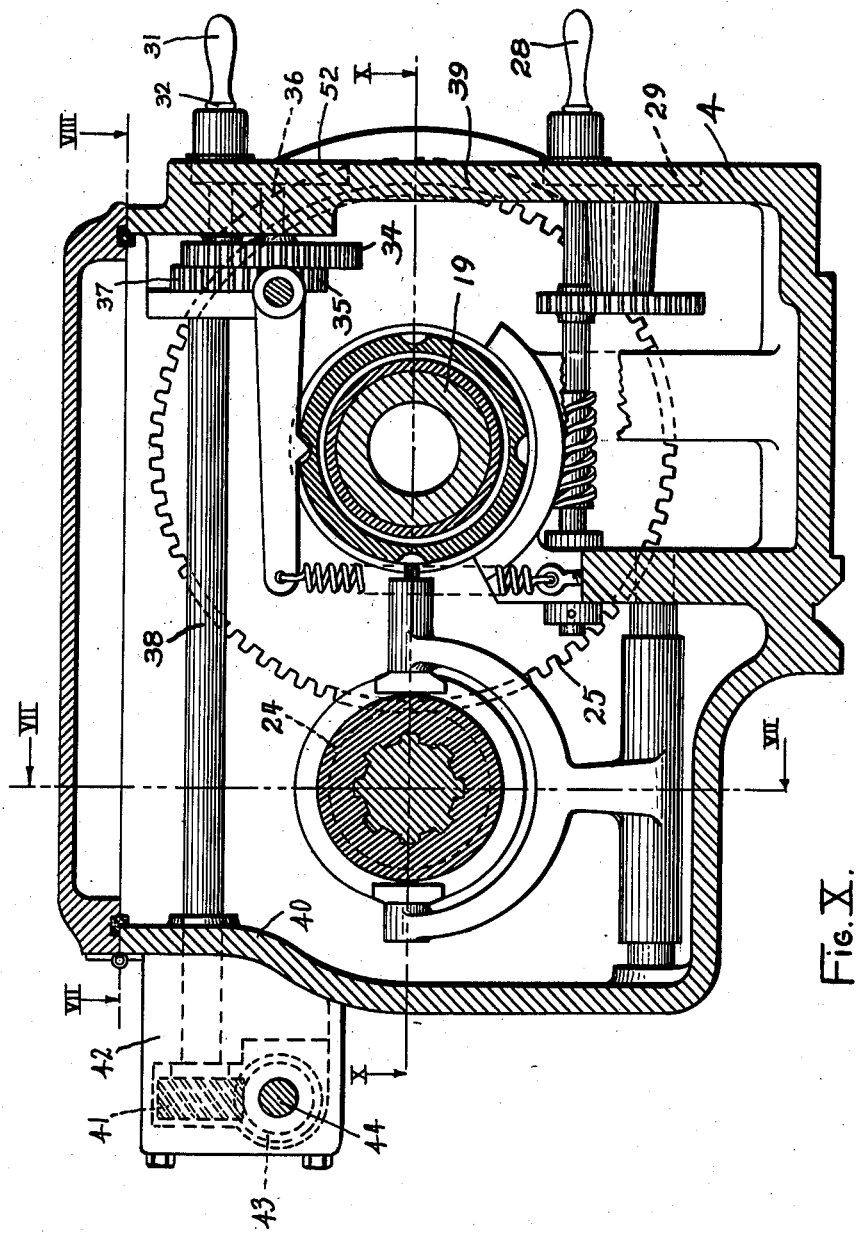
Fig. X.

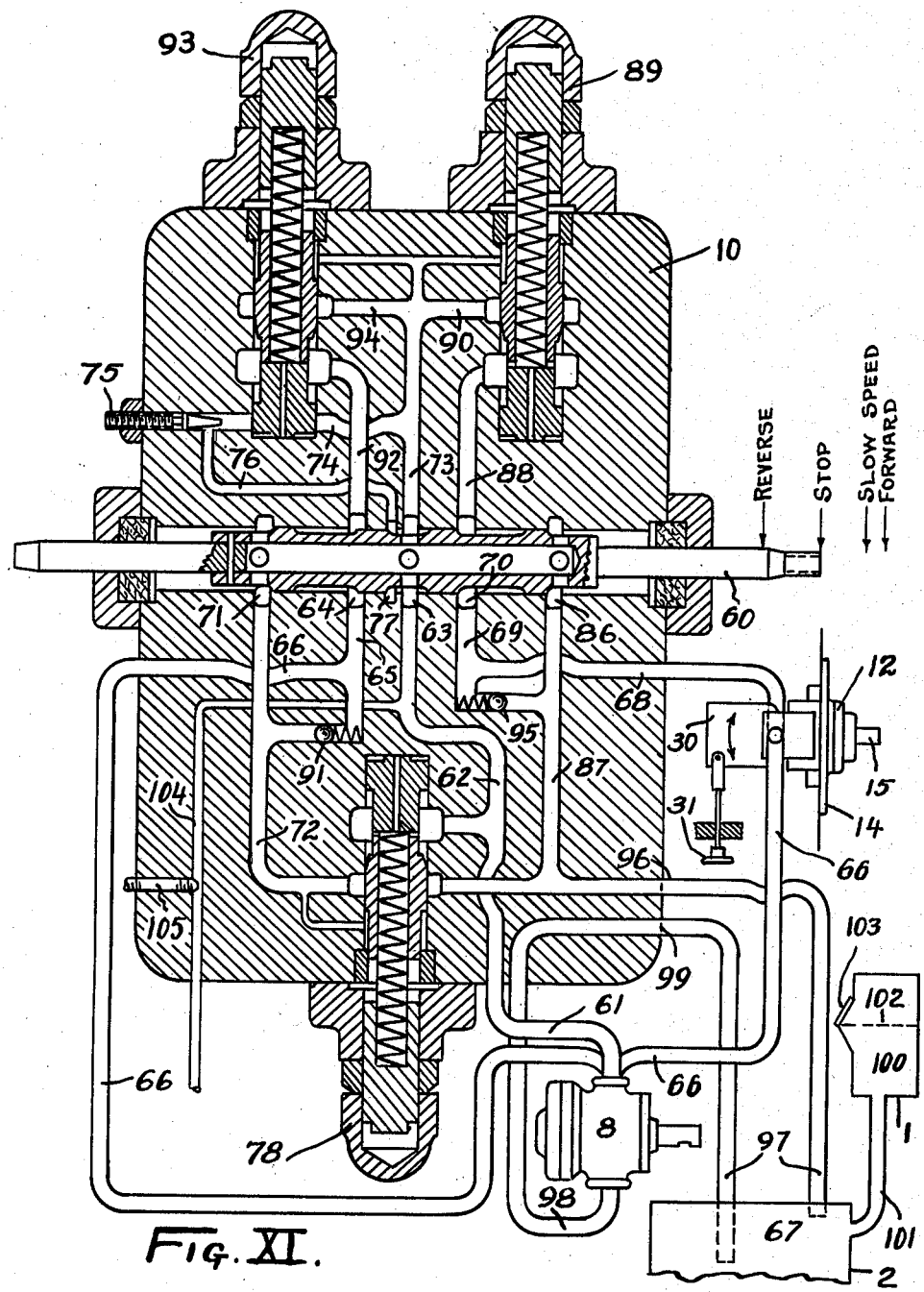

2,124,348

UNITED STATES PATENT OFFICE 2,124,348

HYDRAULIC LATHE TRANSMISSION

William F. Groene, Ross M. Bacon, and Harold J. Siekmann, Cincinnati, Ohio, assignors to The R. K. Le Blond Machine Tool Company, Cincinnati, Ohio, a corporation of Delaware Application April 26, 1937, Serial No. 138,960

11 Claims. (Cl. 82—2)

Our invention pertains to lathes, and more particularly to the type of lathes known as tool room lathes, which are provided with a large range of spindle speeds accurately controllable for machining the large variety of different classes of work for which such lathes are ordinarily used.

An object of our invention is to provide a lathe transmission which is driven by hydraulic power in which a large range of infinitely variable speeds are obtainable for the lathe spindle.

In connection with this hydraulically driven transmission it is our intention to provide means for automatically starting, stopping, and reversing the lathe spindle by controlling the hydraulic driving mechanism.

It is also our object to provide automatic means for actuating said hydraulic driving mechanism at relatively slow speed for efficient and safe shifting of supplemental speed change mechanism in the headstock transmission.

Another object is to provide in a lathe a headstock which is driven by a hydraulic motor directly connected to the headstock transmission and forming an integral part thereof.

Another object is to provide in a lathe having a hydraulically driven headstock in which the hydraulic motor is mounted on the headstock as an integral unit thereof a source of hydraulic pressure for operating said motor comprising an electrically driven hydraulic pump located in a supporting leg for the bed of the lathe.

A still further object is to provide a hydraulically driven lathe in which the control panel for the hydraulic system is mounted on a supporting leg for the bed of the lathe and in which leg is provided a fluid reservoir associated with said panel for said hydraulic system.

A further object is to provide a hydraulically driven headstock which is lubricated from the fluid pressure system for actuating the hydraulic driving mechanism.

Another unique arrangement is to have a dry sump headstock and to drain all surplus oil from the headstock transmission into a compartment in the bed of the lathe.

Still another arrangement is to have interconnected lubricant chambers in the bed and in a supporting leg for said bed.

It is also a part of our invention to provide control mechanism for changing the speed of the hydraulic driving mechanism and supplemental change speed mechanism in the lathe transmission and to provide inter-related dial indicating devices associated with said control mechanism.

Further objects will appear from the detailed description of the accompanying drawings forming part of this specification in which:

Figure I is a perspective view of the rear of a lathe particularly showing the arrangement of hydraulic driving mechanism for the headstock of the lathe.

Figure II is a left hand end elevation of the lathe particularly showing the location of the hydraulic driving motor mounted on the headstock and the control panel mounted on a supporting leg for the bed of the lathe.

Figure III is a view partly in section on line III—III of Figures II, IV, and V, showing the spindle start and stop lever for controlling the hydraulic driving motor.

Figure IV is a view longitudinally of the lathe partly in section on line IV—IV of Figures III and V showing the spindle start and stop lever for controlling the hydraulic driving motor.

Figure V is a front elevation of a portion of the left hand end of the lathe particularly showing the mounting of the control panel and the interconnected lubricant chambers in the bed and leg of the lathe.

Figure VI is a front elevation of a portion of the lathe headstock showing the control levers and associated indicating dials for spindle speed changes.

Figure VII is a view partly in section on line VII—VII of Figures II, VIII, IX and X.

Figure VIII is a plan view of the lathe headstock on the line VIII—VIII of Figures II, VI, VII, IX, and X with the headstock cover plate removed and partly broken away to more clearly show the driving connection between the hydraulic driving motor and the lathe transmission.

Figure IX is a vertical transverse section through the lathe headstock on the line IX—IX of Figures VIII and VII.

Figure X is a vertical transverse section through the lathe headstock on the line X—X of Figures VII and VIII.

Figure XI is a circuit diagram of the hydraulic system for the lathe.

For purposes of an exemplary disclosure we have shown our invention applied to a lathe of a character set forth in the copending application of William F. Groene, George W. Luning and Arthur W. Aufderhar filed June 10, 1936, Serial No. 84,500. The general arrangement of the lathe is shown in Figures I and II comprising the bed 1 mounted on the supporting legs 2 and 3 and having a headstock 4, a tailstock 5, and tool carriage 6 mounted in a usual manner on the bed 1. In the leg 2 is mounted an electric motor 7 which drives a hydraulic pressure pump 8 mounted thereon by suitable bolts 9. On the leg 2 is mounted the control panel 10 by suitable screws 11. On the headstock 4 is mounted the variable speed hydraulic driving motor 12, of a character for example as set forth in Patent 1,931,969 of Hans Thoma issued October 24, 1933, by means of appropriate bolts 13 passing through the flange 14.

The output shaft 15 of the hydraulic motor 12 has a driving pinion 16 fixed thereto which drivingly engages the gear 17 fixed on the worm drive shaft 18 of the headstock transmission. Power from the hydraulic motor may be delivered from shaft 18 directly to the lathe spindle 19 through the spiral gears 20 and 21 or through the back gearing comprising the gears 22—23 and 24—25 driven by the worm 26 and worm wheel 27 fully set forth in application Serial No. 84,500. A manual control lever 28 with an associated indicating dial 29 is provided for properly selecting and indicating these gear changes as set forth in said application Serial No. 84,500.

Control means are provided for swinging the oscillatable cylinder part 30 of the variable speed hydraulic pump 12 comprising the manual control lever 31 which is mounted on the shaft 32 journaled in the headstock 4. A pinion 33 formed on the shaft 32 drivingly engages the gear 34 of the compound gear 34—35 fixed on the shaft 36 journaled in the headstock 4. The gear 35 in turn drives the gear 37 formed on the shaft 38 journaled in the front wall 39 and rear wall 40 of the headstock 4 and having a spiral gear 41 mounted on the rearward projection of shaft 38 beyond the rear wall 40.

A housing 42 fixed to the rear wall 40 encloses the gear 41 and the spiral gear 43 with which it meshes, the gear 43 being fixed on a shaft 44 journaled in the housing 42 and also in the flange 14 of the hydraulic motor 12. On the portion of the shaft 44 inside the flange 14 is formed a pinion 45 which engages a gear 46 of the compound gear 46—46A rotatably mounted on an appropriate stud 47 fixed in the flange 14, the gear 46A engaging the gear segment 48 which in turn is appropriately fixed on the oscillatable cylinder part 30 by screws 49 passing through its flanged portion 50. It can thus be seen that by rotation of the lever 31 the oscillatable cylinder part 30 may be swung about its pivot axis 51 for obtaining variable speeds for the output shaft 15 of the hydraulic motor 12.

Mounted on the front wall 39 of the headstock 4 and associated with the indicating dial 29 is the indicating dial 52 which is connected to the shaft 36 so that upon rotation of the lever 31 the dial 52 will be rotated relative to the indicating mark 53 indicating the speeds selected for the hydraulic motor. Preferably the dial 52 is so arranged and interrelated with the dial 29 as to show actual spindle speeds in relation to selected mechanical gear changes made by the lever 28.

In order to control the hydraulic motor 12 for "forward", "reverse", "slow speed" for gear shifting, and "stopping" the lathe transmission when rotating, a spindle control lever 54 conveniently located at the front of the lathe is mounted on the usual spindle control rod 55 by means of the pin 56 fixed in said rod whereby the rod may be rocked by manipulating the lever 54 up and down while also permitting swinging of the lever axially of the rod 55. The lever 54 is connected through appropriate linkage comprising the rod 57, the bell crank 58 mounted on rod 58a and the link 59, to the control valve spool 60 for appropriately axially moving the spool in the control panel 10.

Noting particularly Figure XI, when it is desired to operate the hydraulic motor in "forward" rotation, the valve spool 60 is shifted to the "forward" position by manipulating lever 54 to the "forward" position shown in Figures III and IV. Fluid pressure is then directed from the pump 8 through lines 61 and 62, valve recess 63, across the valve spool 60 to valve recess 64, lines 65 and 66 to the hydraulic motor 12. The exhaust fluid pressure from the motor 12 passes to the reservoir 67 in the leg 2 through lines 68 and 69, valve recess 70, through the hollow valve spool 60, valve recess 71, and exhaust line 72. If the pressure in the circuit builds up beyond the setting of the relief valve 78, the fluid by-passes to the reservoir 67 through line 72.

In order to facilitate making the supplementary gear changes by means of the lever 28 means are provided for causing the hydraulic motor to operate at a predetermined "slow speed" by appropriately manipulating the lever 54 to "slow speed" position, Figures III and VI, whereby the valve spool 60 is shifted to the "slow speed" position, fluid pressure is directed from the pump 8 through lines 61 and 62, valve recess 63, lines 73 and 74, needle valve 75, line 76, valve chamber 77, valve spool 60, valve recess 64, lines 65 and 66 to the hydraulic motor 12, rotating the motor in "forward" direction at a predetermined "slow speed". The exhaust fluid pressure from the motor 12 passes to the reservoir 67 in the leg 2 through link 68 and 69, valve recess 70, through the hollow valve spool 60, valve recess 71, and exhaust line 72. The "slow speed" of the motor may be regulated by proper adjustment of the needle valve 75. During the "slow speed" portion of the cycle while gears are being changed by lever 28, part of the delivery by the pump 8 is by-passed through relief valve 78 at the pressure for which it is set.

Normally the lever 54 is positioned along line 79, Figure III, for shifting the "stop", "forward" or "reverse", by the spring urged detent plunger 80 located in the bed 1 of the lathe and bearing against the arcuate detent surface 81 of the lever 54, swinging the handle about the pin 56 into position 79. In order to select the "slow speed" position for gear shifting the lever is swung to position 82 whereupon the projecting end 83 of the lever 54 engages the locating block 84 fixed on the bed 1 and upon moving the lever 54 up and down while held in position 82 the projecting end 83 will enter the slot 85 in block 84 to automatically position the lever 54 in the "slow speed" position. Upon release of the lever 54 it is again returned to position 79 by the detent plunger 80.

Means are provided for quickly stopping the lathe spindle without shock or excessive coasting of the lathe spindle when rotating in either direction.

In order to bring the spindle to a "stop" from "forward" rotation, the valve spool 60 is shifted to the "stop" position, fluid pressure is directed from the pump 8 through lines 61 and 62, valve recess 63, through the hollow valve spool 60 to valve recesses 71 and 86, and lines 72 and 87 to the reservoir 67. Valve recesses 64 and 70 are blocked. Pressure created in lines 68 and 69 by the momentum of the hydraulic motor and lathe transmission is directed through valve recess 70, line 88, relief valve 89, lines 90 and 73, valve recess 63, through hollow valve spool 60, valve recesses 71 and 86, lines 72 and 87 to the reservoir 67. In this manner the hydraulic motor comes to a stop at a rate depending upon the setting of relief valve 89. At this time, the fluid pumped out of the line 66 is replenished from the reservoir 67 through line 72 and check valve 91.

When the hydraulic motor is to be operated in "reverse" for reverse spindle rotation, the valve spool 60 is shifted to the "reverse" position, fluid pressure is directed from the pump 8 through lines 61 and 62, valve recess 63, across the valve spool 60 to valve recess 70, lines 69 and 68 to the hydraulic motor, rotating the motor in "reverse" direction. The exhaust fluid from the motor passes to the reservoir 67 through lines 66 and 65, valve recess 64, through the hollow valve spool 60, valve recess 86, and line 87.

In order to "stop" the hydraulic motor and lathe transmission when operating in "reverse" rotation, the valve spool 60 is shifted to the "stop" position, fluid pressure being directed from the pump 8 through lines 61 and 62, valve recess 63, through hollow valve spool 60 to valve recess 71 and 86, and lines 72 and 87 to the reservoir 67. Valve recesses 64 and 70 are blocked. Pressure created in lines 66 and 65 by the momentum of the hydraulic motor and lathe transmission is directed through valve recess 64, line 92, relief valve 93, lines 94 and 73, valve recess 63, through hollow valve spool 60, valve recesses 71 and 86, lines 72 and 87 to the reservoir 67. In this manner the motor comes to a stop at a rate depending upon the setting of relief valve 93. At this time the fluid pumped from the line 68 is replenished from the reservoir 67 through line 87 and check valve 95.

It is to be noted that check valves 91 and 95 permit free flow from the reservoir 67 to the hydraulic motor ports during the deceleration or stopping period of "forward" and "reverse" rotation, respectively. At other times they are closed by a light spring plus pressure on alternate checks while running in either direction.

Relief valve 78 protects the pump 8 from excessive pressure and operates during periods when the motor 12 is being accelerated.

Relief valves 89 and 93 are alternately effective during stopping "forward" or "reverse" rotation of the motor. They may be set so as to give the desired rate of deceleration without shock. These valves are not effective during the time the motor is running "forward" or "reverse", as it will be noted that during such periods, both the inlet and discharge of the valve in the supply circuit is subjected to pressure. For example, during "forward" rotation, lines 92 and 94, the inlet and discharge of relief valve 93, both connect to pressure as they are in communication with valve recesses 63 and 64 of valve spool 60 through which fluid is passing to the hydraulic motor 12.

It can thus be seen that limiting pressures effecting acceleration of the fluid motor and deceleration of same may be independently regulated and controlled to suit the requirements of the installation.

The control panel 10, incorporating the mechanism shown in Figure XI, is so mounted on the leg 2 of the lathe as to require a minimum of external piping to connect up the associated apparatus comprising the fluid reservoir 67, the pump 8, and the hydraulic motor 12. Lines 72 and 87 are connected by port 96 in panel 10 through opening 97 to the reservoir 67. The intake line 98 is similarly connected to the reservoir 67 through port 99, no piping being required for these connections, the panel 10 forming an integral part of the reservoir 67.

A reservoir 100 is also provided in the bed 1 of the lathe beneath the headstock 4, and is inter-connected with the reservoir 67 by suitable piping 101. The reservoir 67 is maintained completely filled at all times and the reservoir 100 is maintained to the level 102 by applying liquid through the filler opening 103.

The mechanical parts of the lathe headstock transmission are lubricated directly from the hydraulic pump 8 through lines 61, 62 and 104. A suitable adjustable restriction 105 is provided in line 104 to regulate the flow of lubricant to the working parts. No lubricant reservoir is provided in the headstock 4, all surplus lubricant discharged from the working parts of the headstock transmission passing through the opening 106, Figure IX, into the reservoir 100 in the bed 1 of the lathe thus preventing any loss of fluid supply from the hydraulic system in lubricating the transmission mechanism.

Having fully set forth and described our invention, what we claim as new and desire to secure by United States Letters Patent is:

1. In a lathe, a bed, a supporting base for said bed, a headstock mounted on said bed, means for rotating the work spindle in said headstock comprising a hydraulically driven change speed transmission in said headstock, a fluid pressure pump and a driving motor for said pump mounted in said base, a hydraulic control panel mounted on said base, inter-connecting means between said panel and said pump and hydraulic driving motor, means for effecting speed changes in said change speed transmission, and means for operating said control panel whereby said hydraulic driving motor may cause the spindle to rotate at a predetermined relatively slow rate of speed to facilitate making said speed changes in said change speed transmission.

2. In a lathe, a bed, a supporting base for said bed, a headstock mounted on said bed, a hydraulic driving motor in said headstock for rotating the lathe spindle, a fluid pressure pump and a driving motor for said pump, a fluid reservoir for said pump mounted in said base, a control panel mounted on said base forming a part of and connected to said reservoir, inter-connecting means between said panel and said pump and hydraulic driving motor, and means for operating said panel to thereby control the operation of said hydraulic driving motor.

3. In a lathe, a bed, a supporting base for said bed, a headstock mounted on said bed, a hydraulic driving motor in said headstock for rotating the lathe spindle, a fluid pressure pump and a driving motor for said pump for operating said hydraulic driving motor, a fluid reservoir for said pump mounted in said base, means for lubricating said headstock from said pump, a reservoir in said bed for catching excess lubricant from said headstock, inter-connecting means between said reservoirs whereby excess lubricant from said headstock may be returned to said reservoir for said pump.

4. A lathe headstock comprising a housing, a hydraulic driving motor mounted on said housing, a drive shaft projecting from said hydraulic motor into said housing, a pinion on said shaft, a worm shaft journaled in said housing, a gear driven by said pinion fixed on said worm shaft, and worms on said worm shaft adapted to drive a compound back gear, a work spindle, and a feed drive shaft journaled in said housing.

5. A lathe headstock comprising a housing, a hydraulic driving motor mounted on said housing, a drive shaft projecting from said hydraulic motor into said housing, a pinion on said shaft, a worm shaft journaled in said housing, a gear driven by said pinion fixed on said worm shaft, a back-gear shaft journaled in said housing, a worm wheel fixed on said back gear shaft, a worm on said worm shaft adapted to drive said worm wheel, a compound back gear slidably mounted on said back gear shaft for engagement with appropriate gears on the work spindle or to be disconnected therefrom, a worm wheel on said spindle adapted to be connected to or disconnected from driving relation with said spindle, a worm on said worm shaft adapted to drive said second mentioned worm wheel, a feed drive shaft, a worm wheel on said feed drive shaft, and a worm on said worm shaft adapted to drive said last mentioned worm wheel.

6. A lathe headstock comprising a housing, a variable speed hydraulic driving motor mounted on said housing, a drive shaft projecting from said hydraulic motor into said housing, a pinion on said shaft, a worm shaft journaled in said housing, a gear driven by said pinion fixed on said worm shaft, a back-gear shaft journaled in said housing, a worm wheel fixed on said back-gear shaft, a worm on said worm shaft adapted to drive said worm wheel, a compound back-gear slidably mounted on said back gear shaft for engagement with appropriate gears on the work spindle or to be disconnected therefrom, a worm wheel on said spindle adapted to be connected to or disconnected from driving relation with said spindle, a worm on said worm shaft adapted to drive said second mentioned worm wheel, a feed drive shaft, a worm wheel on said feed drive shaft, a worm on said worm shaft adapted to drive said last mentioned worm wheel, control means on said housing for regulating said variable speed driving motor, and control means on said housing for actuating said compound back-gear and said worm wheel on said work spindle in a predetermined sequence.

7. In a lathe headstock as set forth in claim 6, control means for said variable speed hydraulic motor comprising a crank handle, transmission gearing between said crank handle and the variable element of said motor whereby rotation of said crank handle causes variations in the output speed of said motor, a dial rotatable by rotation of said crank handle, control means for said back gear and said worm wheel on said work spindle comprising a crank handle and a cam drum actuated by rotation of said second mentioned crank handle, gear shifting yoke mechanism actuated by said cam for shifting said back gear and said worm wheel on the work spindle, a dial mounted on said headstock housing and rotatable upon rotation of said second mentioned crank handle, data on said second mentioned dial indicating back gear, intermediate back gear, and high speeds for spindle rotation and also a position indicating coarse threading and relieving operation for the lathe, and data on said first mentioned dial indicating the various speeds obtainable from said driving motor in terms of spindle speeds for each position selected on said second mentioned dial.

8. In a lathe headstock, transmission gearing adapted to produce back-gear, intermediate back gear and high speeds and feeds for coarse threading and relieving, control means on said headstock for selecting said various speeds, a dial indicating device associated with said control means to show said selected position, a variable speed hydraulic driving motor for operating said transmission, control means on said headstock for varying the speed of said driving motor, a dial indicating device associated with said last mentioned control means, data on said last mentioned dial indicating means showing the spindle speeds which may be obtained for the various positions of said control means for said driving motor for the various positions selected for the control means for said back-gear, intermediate back gear, high speeds and coarse threading and relieving positions of said first mentioned control means.

9. In a lathe, a bed, a headstock mounted on said bed, means for rotating the work spindle in said headstock comprising a variable speed hydraulic driving motor, change speed transmission mechanism between said motor and said work spindle, control means in said headstock for varying the speed of said driving motor, dial indicating means associated with said control means, control means for selecting various speeds of said change speed transmission mechanism, dial indicating means associated with said last mentioned control means, data on said first mentioned dial indicating means showing the various spindle speeds which are obtained for positions of the control means associated therewith for positions selected for said last mentioned control means.

10. In a lathe, a bed, a headstock mounted on said bed, means for rotating a work spindle in said headstock comprising a variable speed hydraulic driving motor, and a change speed transmission mechanism between said motor and said work spindle, control means for varying the speed of said hydraulic driving motor and control means for selecting various speeds of said change speed transmission, a dial associated with each of said control means, the dial of said second mentioned control means showing positions to be selected when using the lathe in low back gear, high back gear, high speed, and coarse threading and relieving, and the dial for said first mentioned control means indicating various speeds which may be selected for said spindle for the various speeds selected for said second mentioned control means.

11. In a lathe, a headstock, a transmission in said headstock, a hydraulic driving motor for operating said transmission, and control means for said hydraulic driving motor comprising a lever movable in a plane to a forward and reverse position each side of a stop position, said lever also having movement perpendicular to said first mentioned plane of movement, in one position in said second mentioned plane said lever being adapted to be moved to forward or reverse or stop position and in said second position in said second mentioned plane of movement said lever being adapted to be moved from stop position to a predetermined slow speed position when making speed changes in said headstock transmission.

WILLIAM F. GROENE.
ROSS M. BACON.
HAROLD J. SIEKMANN.